Patented Aug. 10, 1943

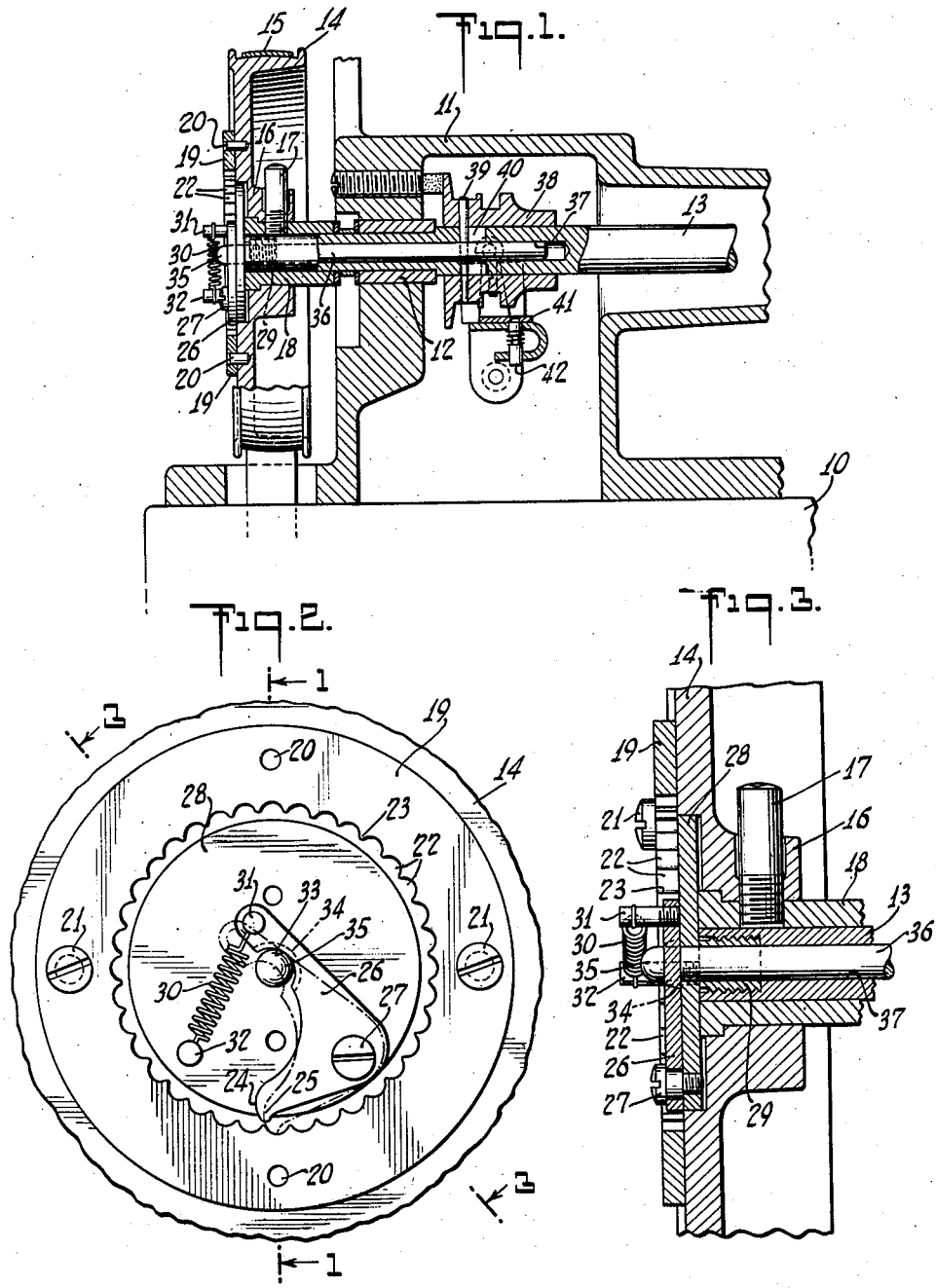

2,326,611

UNITED STATES PATENT OFFICE 2,326,611

CLUTCH

Charles L. Bossmeyer, Stratford, and Simon Yerkovich, Bridgeport, Conn., assignors to Dictaphone Corporation, New York, N. Y., a corporation of New York Application October 8, 1941, Serial No. 414,062

2 Claims. (Cl. 192—28)

This invention relates to clutches, and particularly to clutches of the type used to drive the record support shafts of commercial phonographs, such as dictating machines.

In the now pending application, Serial No. 409,525, filed September 4, 1941, by John E. Renholdt, assignor to Dictaphone Corporation, a corporation of New York, there was disclosed a drive mechanism for phonographs including a clutch of this type for transmitting rotation from a driving element to a sound record support. In that construction, a driving pulley, loosely mounted on a record support shaft, carried a disengageable driving pawl normally spring pressed into engagement with teeth distributed about the periphery of a ratchet wheel rigidly mounted at the end of the said shaft, so as to effect rotation of the shaft and record support. The driving pawl was provided with an arm extending across the axis of the shaft and in such manner as to lie in the projection path of a shift rod axially disposed within and rotatable with said shaft. When endwise movement was imparted to the said rod by suitable clutch actuating means, the end of the rod advanced so as to engage the said arm of the drive pawl and release the pawl from engagement with the teeth of the ratchet disc, thus disconnecting the drive through the clutch elements.

The clutch disclosed in that application was very effective in accomplishing the objects set forth therein, but was found, in use, to have certain practical disadvantages. It is an object of the present invention to provide a clutch mechanism of similar type but comprising certain modifications which tend to avoid said disadvantages by simplifying the structure, lowering the cost of manufacture, and by giving greater sureness of operation and a longer effective period of usefulness.

One of the principal objections to the form of ratchet clutch mentioned above resulted from the fact that the driving pawl cooperated with sharp teeth disposed upon the periphery of the ratchet wheel. In such a construction the teeth must have mathematical precision of contour in respect to the cooperative face of the pawl, and the back and front face of each tooth must intersect in a relatively sharp point in order to secure satisfactory clutch operation. Thus great accuracy was required in the manufacture of the clutch parts, particularly of the ratchet wheel, which could not readily be made by stamping or punching because of the necessary hardness of the metal employed if the ratchet teeth were, in use, to withstand the tendency to lose sharpness of outline and become so much rounded at the points as to appreciably lower the efficiency of clutch operation.

This and other objections have been remedied in the construction embodying the present invention by the substitution in the clutch, for the externally toothed ratchet wheel, of an annular ring having its inner periphery cut or formed to provide a surface comprising contiguous semicircular grooves or scallops and, further, substituting a pawl operating from within the annulus outwardly toward the scalloped surface, which pawl is provided with a nose somewhat like a parrot's beak, the convex surface of which is curved properly to interfit with the individual scallops formed in the annular ring. Such a construction has the following advantages: (a) The scalloped contour may readily be made by punching and requires practically no after grinding, filing or dressing. (b) The association of the rounded end of the pawl with the concave surfaces of the ring is such that the driving power tends to set the pawl more firmly in operative position (the reverse is true in the case of the external ratchet and pawl). (c) The rounded contour of pawl and cooperative surface is such that wear of the clutch parts tends to make them fit more perfectly (whereas wear on a ratchet wheel having pointed external teeth tends to impair the efficiency and operation of the clutch).

Other objects will be in part obvious and in part pointed out hereinafter.

The invention accordingly consists in the features of construction, combinations of elements, and arrangements of parts as will be exemplified in the structure to be hereinafter described and the scope of the application of which will be indicated in the following claims.

In the accompanying drawing in which is shown one of the various possible embodiments of our invention.

Fig. 1 is a longitudinal sectional view of the left-hand portion of a well known type of dictating machine, taken along line 1—1 of Fig. 2, showing the driving means, the driven means, a clutch connection embodying the present invention, and means for operating the clutch;

Fig. 2 is a left end elevation of a portion of the machine shown in Fig. 1, drawn to a larger scale; and Fig. 3 is a cross-section taken on line 3—3 of Fig. 2.

Similar reference characters refer to similar parts throughout the various views of the drawing.

Referring to the drawing, the dictating machine embodying the present invention is disclosed as comprising a base 10 supporting a housing 11 providing a bearing 12 for the driven shaft 13, which supports the record tablet mandrel, not shown. To the left of the housing 11 there is provided a driving pulley 14 engaged by a belt 15 extending to the pulley of a motor, not shown, which furnishes the power to rotate the shaft 13. This pulley has a cast-in hub 16 which is held rigidly by means of a hollow oiling stud 17 upon a pulley bushing 18, rotatably mounted upon the shaft 13. An annular ratchet ring 19 is rigidly mounted upon the side of the pulley 14, which faces away from the bearing 12, and is secured to the pulley concentrically with respect to the axis of the shaft 13 by means of dowel pins 20 and cap screws 21.

The inner periphery of the driving ring 19 is formed with a continuous series of semi-circular grooves or scallops, whereby the whole inner surface of the ring forms a curve comprising the said scallops, indicated at 22, and the intervening points 23 where the individual scallops adjoint one another. This inner surface of the driving ring thus provides a series of concave engagement surfaces adapted to cooperate with the convex curved surface 24 of the beaklike nose 25 of a pawl 26. This pawl is pivoted by means of a shoulder stud 27 upon the outer surface of a disc 28 forming part of a sleeve 29 screw-threaded into the outer end of the shaft 13. This ratchet pawl is normally held in driven contact with the inner surface of the ring 19 by means of a spring 30 secured at one end, as at 31, to the pawl 26 and at the other end, as at 32, to the said disc 28. It will be seen from the foregoing, that the ring 19 and pawl 26 constitute normally engaged elements of a clutch for transmitting power from the pulley 14 to the driven shaft 13.

As disclosed in Fig. 2, the pawl 26 is indented, as at 33, and the surface of the indentation chamfered, as shown by the dotted lines 34 in Figs. 2 and 3, to provide a camming surface adapted to be engaged by the beveled end 35 of a clutch rod 36 mounted to reciprocate coaxially within the bore 37 of the shaft 13. When this rod is projected by suitable operating mechanism outwardly beyond the disc 28, its said beveled end 35 engages the chamfered surface 34 of the pawl 26 and serves to cam the pawl out of engagement with the scallop toothed driving ring 19 thus rendering the clutch inoperative. Retraction of the rod 36, so as to withdraw it from contact with the pawl 26, permits the pawl 26 to be forced by spring action into operative engagement with the ring 19, as shown by the dash-dot lines in Fig. 2. In Fig. 2 the pawl is shown in solid lines in its inoperative position, in which there is no driving connection established between the pulley 14 and the shaft 13.

The clutch rod 36 may be shifted for the purpose of connecting or disconnecting the pulley in any suitable manner, as for instance by the collar 38 which is slidably mounted upon the shaft 13, a pin 39 passing diametrically therethrough and through the rod 36, serving to secure these two members together for longitudinal movement relative to the shaft 13. The shaft 13 is slotted, as at 40, to permit this endwise movement. This collar may be shifted in any usual manner, as by means of a yoke 41 suitably pivoted within the housing 11 and rockable either by hand or preferably by the electromagnetic means indicated generally at 42 in Fig. 1 of the drawing, or other suitable magnetic device. The device 42 is more fully shown and described in the above referred to companion application, to which reference may be had for details of construction and of operation not pertinent herein.

From the foregoing, it will be seen that the present clutch is simple of construction, may be readily manufactured, is durable, and may be used effectively with many different kinds of operating means, and in use will avoid "topping" of the engaging parts of the clutch in such a manner as to render clutch operation uncertain and unsatisfactory, and that, with the present clutch, manipulation of the actuating means results in positive operating engagement of the clutch parts without danger of slipping.

We claim:

1. In a device of the character set forth, in combination, an exterior member rotatably mounted in coaxial relation with a rotatable interior member, a clutch element rigidly attached to said exterior member comprising an annular ring having its inner periphery scalloped to provide a plurality of concave surfaces, a spring pressed pawl pivotally mounted upon said interior member having a convex engagement surface adapted normally to make driving contact with the scalloped surface of said annular ring, a rod shiftable coaxially within said interior member to engage an extended portion of and trip said pawl out of driving contact with said annular ring, and means for shifting said rod.

2. In a device of the character set forth, in combination, a driven shaft, a drive pulley rotatable upon said shaft adjacent an end thereof, an annular ring rigidly mounted on said pulley in coaxial relation with said shaft having a scalloped inner peripheral surface, a disc rigidly carried at the said end of said shaft within a counterbore of said pulley, a pawl operable in the plane of said ring pivotally mounted upon said disc and having a convex surface adapted to make a driving connection with the scalloped surface of said ring, a spring normally holding said pawl in operative engagement with said ring, and control means comprising a rod shiftable axially within said shaft and disc to engage an extended portion of said pawl and operable to trip said pawl out of said operative engagement.

CHARLES L. BOSSMEYER.
SIMON YERKOVICH.